Dec. 8, 1953    J. R. FLANAGAN    2,661,706
MEANS FOR HANDLING CANDIES
Filed May 1, 1951    3 Sheets-Sheet 1
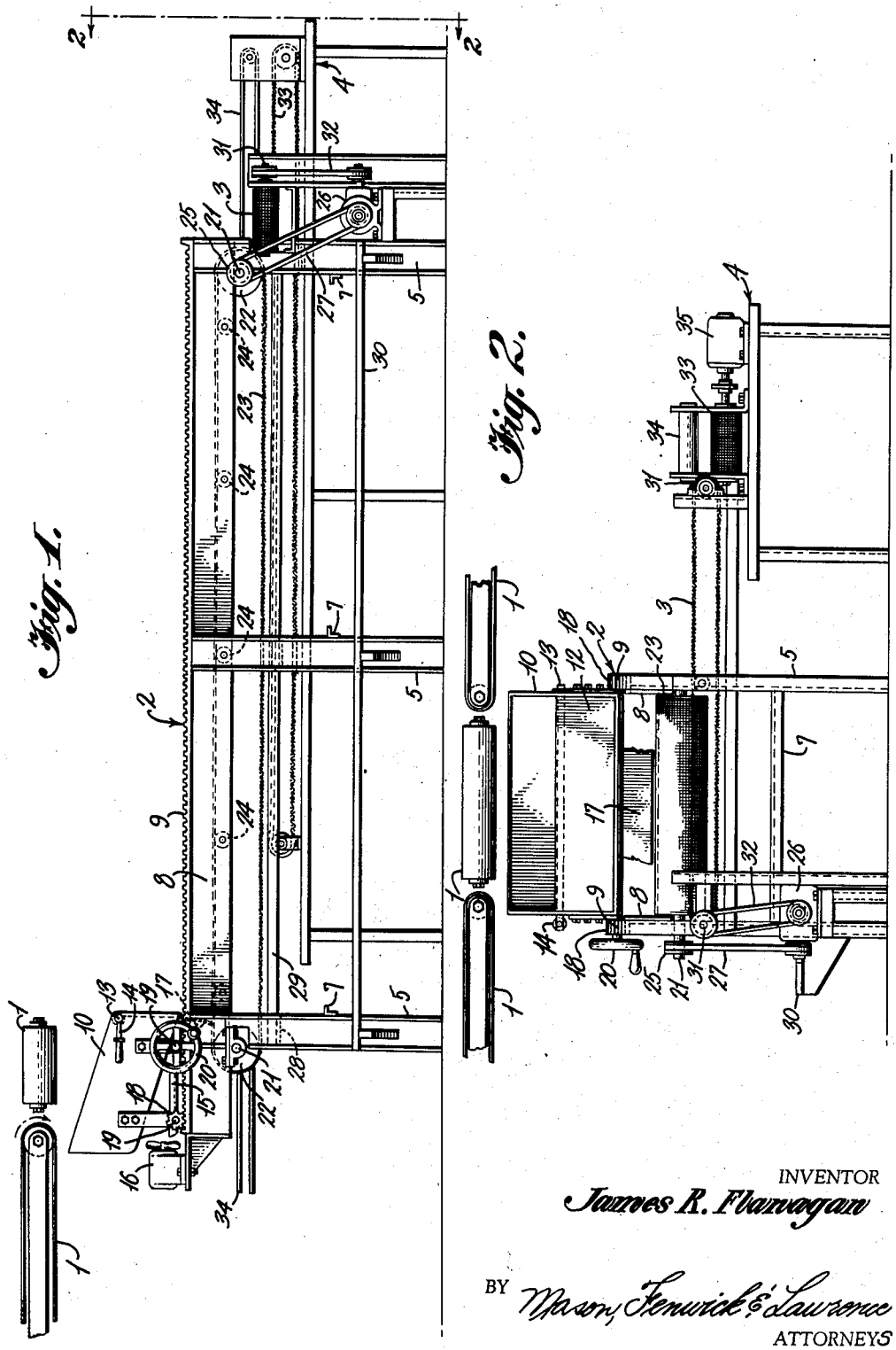
INVENTOR
James R. Flanagan
BY Mason, Fenwick & Lawrence
ATTORNEYS

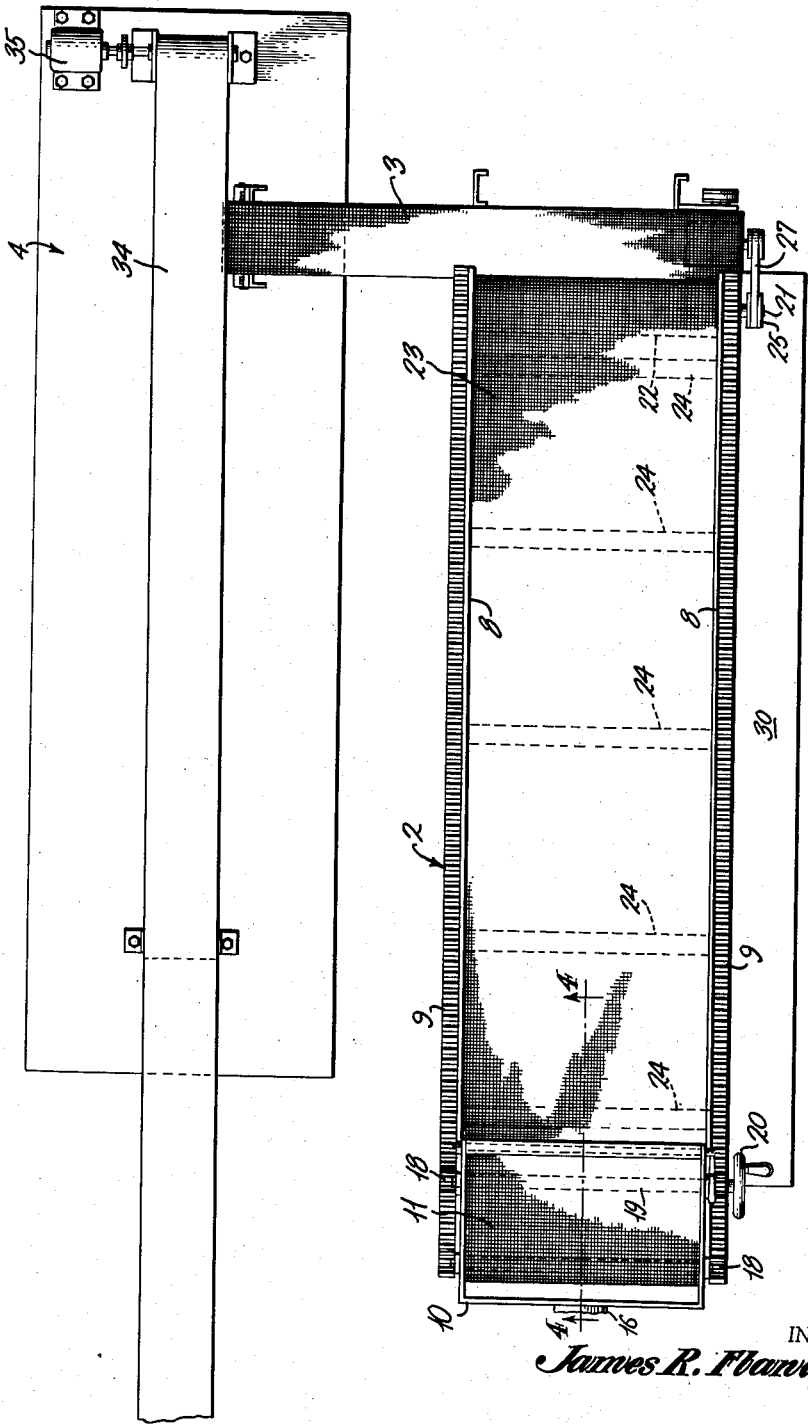

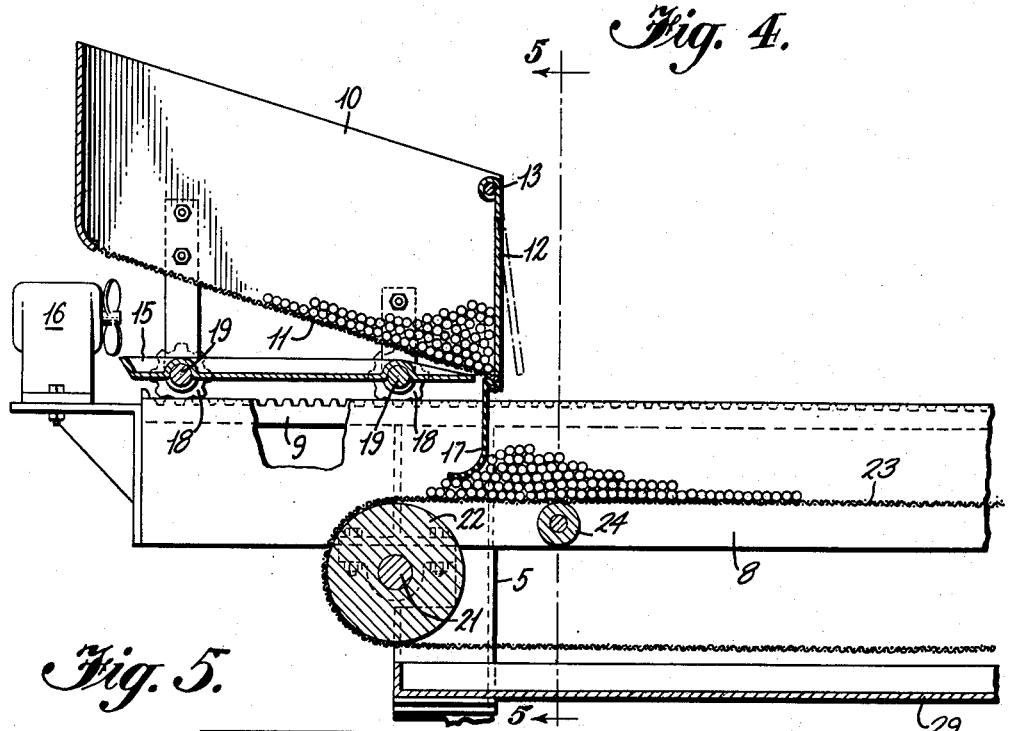
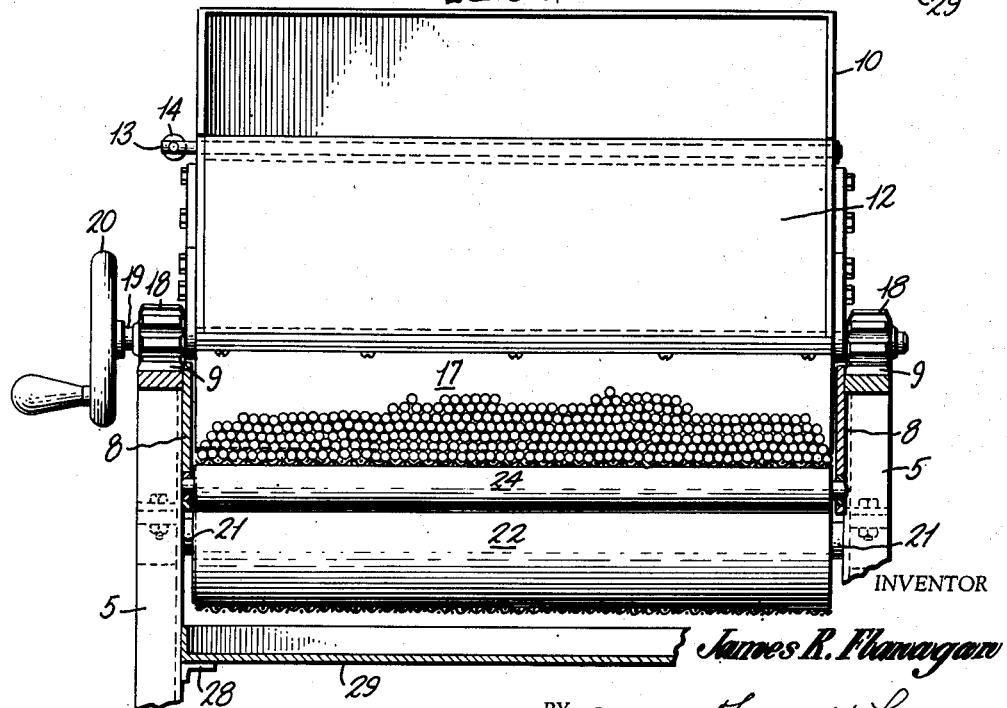

Patented Dec. 8, 1953

2,661,706

UNITED STATES PATENT OFFICE 2,661,706

MEANS FOR HANDLING CANDIES

James R. Flanagan, Westville Grove, N. J., assignor to Stephen F. Whitman & Son, Inc., Philadelphia, Pa., a corporation of Pennsylvania Application May 1, 1951, Serial No. 223,935

3 Claims. (Cl. 107—7)

This invention relates to a means for handling hard candies, and more particularly for handling such candies of assorted types.

The conventional method of handling hard candies, which are to be packed in mixed assortments, is to collect a batch of candy of one type, or flavor, in a small bin having a screen bottom. The batch is cooled, usually by causing air to be moved or blown over the warm candies, and when cool it is placed in a storage container. When containers filled with all of the types or flavors are available, one container of each is dumped in a packing bin. An operator then proceeds with gloved hands to mix the types. When a satisfactory appearing mixture is obtained, it is packed in jars, cans or other containers. This method is time-consuming, and frequently results in imperfect mixtures.

The primary object of the present invention is to provide a means for handling the candies expeditiously, and whereby an even mixture of candies from assorted batches may be obtained.

Another object is to provide such means whereby rough handling of the candies is sharply reduced, and the small pieces, chips flashings are separated from the whole pieces so that they will not be packed.

Another object of the invention is to provide candy handling means which will reduce the number of manual handlings, and the number of containers needed for storage prior to packing.

Other objects of the invention will become apparent from the following description of one practical embodiment thereof, when taken in conjunction with the drawings which accompany and form a part of this specification.

In the drawings:

Figure 1 is a side view of a candy handling and mixing machine embodying the principles of the present invention;

Figure 2 is an end view of the machine shown in Figure 1;

Figure 3 is a plan view thereof;

Figure 4 is an enlarged vertical section through the receiving hopper end of the machine, and is taken on the line 4—4 of Figure 3; and, Figure 5 is a transverse section taken on the line 5—5 of Figure 4.

The method of the present invention contemplates cooling batches of small hard candies, each batch being of a different type; spreading the different batches in thin superimposed layers, a batch of one type to each layer, upon a flat surface; separating the laminated mass vertically into portions each containing a cross-section of the laminated mass; and packing from the so-separated portions. This will insure an even and uniform mixture in the packed containers.

This method could be carried out by hand, or through the aid of simple mechanical aids, but to expedite the process and insure complete uniformity in operation apparatus is provided which is adapted to carry out the various steps of the method.

The apparatus includes a plurality of batch feeder-belts 1, a cooling, distributing, and mixing machine 2, a transfer belt 3, and a packing table 4.

The batch feeder-belts 1 are in the form of endless conveyors which traverse the space between the sources of supply of the batches of candies of different types and the machine 2. They may extend at different angles from the machine, or they may be located at different levels, the important feature being that they all will deposit their batches into the hopper of the machine 2. The various belts will be driven by suitable mechanism (not shown) and will be separately operable so that one belt at a time may be operated to deposit a batch of candies into the machine hopper.

The machine 2 has a frame composed of vertical legs 5 and the horizontal, longitudinal and transverse frame members 6 and 7. Supported at the tops of the legs on either side of the machine are the side rails 8, each of which has a rack 9 mounted along its upper edge. The racks 9 form trackways upon which a candy receiving hopper 10 may move the full length of the machine.

The hopper 10 is shown as a rectangular bin having an inclined mesh bottom 11. The side of the bin adjacent the lower end of the bottom is formed as a swingable door 12, pivoted to the adjacent side walls at its top by means of a shaft 13. The door is fixed to the shaft, and the shaft is provided with a lever 14, by means of which the door may be adjusted to different degrees of opening to control the flow of candy from the hopper, as will be described. Beneath the hopper, there is suspended a crumb tray 15 to catch the chipped pieces and hard candy dust which sifts through the mesh bottom of the hopper. As the candy is still warm and often semiplastic when dropped into the hopper, a fan 16 is provided to blow air through the candy in the hopper to cool it. The fan may be mounted in any convenient place and is shown mounted on the end of the main frame, so that the hopper will not have to carry this additional weight in its travel down the length of the machine. A light, flexible apron 17 is attached along the front edge of the hopper and extends downward to serve as a leveler for the candy.

To enable the hopper to be moved along the machine, the hopper is mounted on four spur gears 18, a pair being mounted on each of a pair of shafts 19 supported beneath the hopper. One of the shafts 19 has a handwheel 20 fixed to it, so that the shaft may be rotated to move the hopper along the racks 9.

Mounted in journals beneath the side rails 8 near either end of the machine, are the shafts 21. Each shaft carries a roller 22 and an endless mesh belt 23 is entrained about the rollers. A plurality of small rollers 24 are positioned just under the top flight of the belt so that the belt will be supported at a plurality of points along its length to hold it against sagging under the load of candy which is to be placed upon it. It will be apparent as the description proceeds that the belt must be held against sagging to insure a uniform distribution of the candy. One of the shafts 21 may be provided with a pulley 25 and driven from a motor 26 by means of a belt 27.

Brackets 28 are secured to the legs of the machine frame to support a crumb tray 29 which is substantially co-extensive with the belt 23 and positioned just beneath the lower flight of the belt to catch broken candy pieces and dust which may sift through the mesh belt. A catwalk 30 extends the length of the frame to allow an operator to move the hopper 10 along the machine.

At the far end of the belt, the transverse transfer belt 3 is positioned with its top flight below the plane of the top flight of the belt 23. Belt 3 is entrained around rollers 31, one of which is journaled to the main frame of the machine, and the other to the packing table frame. The roller 31 adjacent the belt 23 is driven by belt 32 from the motor 26. Belt 3 is to receive the candy from belt 23 and transport it to the packing table 4.

The packing table is shown as having a pair of endless belts 33 and 34 mounted upon it. The lower belt 33 is of mesh and receives the candy from the transfer belt 3. This belt extends only the length of the packing table. It is driven from a motor 35, which is directly connected to the shaft of one of the belt rollers. The upper belt 34 receives the filled jars or cans of candy and transports them to a capper or sealing machine as the case may be. It will be noted that the packing table is considerably wider than the belts, and that the belts extend over the center of the table. This will allow operators to stand along either side of the table to pack the candies.

In operation candies of different types, or flavors, are fed to the hopper 10 by the different feeder belts 1. These belts are operated one at a time so that the hopper 10 may receive a batch of candy of one type. As previously mentioned, the candy is usually warm, often semi-plastic, and usually still in strip form when it is transported on the belt. The drop from the end of the belt into the hopper will cause the strips to separate into individual pieces, and all broken pieces and dust will sift through the mesh bottom of the hopper into the crumb tray 15, where it is collected for subsequent disposal. The fan 16 will blow air through the candy in the hopper to cool it.

The operator will open the hopper door to the desired extent, to permit the candy to fall upon the belt 23, and move the hopper along the racks 9 by rotating the handwheel 20. The operator can follow the movement of the hopper by walking along the catwalk 30. As the hopper moves down the machine, an even layer of the candy is deposited upon the belt. When the door opening is properly adjusted, the batch of candy in the hopper will uniformly cover the full length of the belt.

When the hopper has been moved to the far end of the machine, the operation of the handwheel is reversed and the hopper returned to its original position beneath the ends of the feeder belts.

A second feeder belt will then be set in motion to deposit another batch of candy in the hopper, the second batch being of a different type, or flavor. The hopper again is caused to traverse the machine to deposit a second uniform layer of candy upon the first. This operation is repeated as many times as there are to be types, or flavors, of candies in the desired mixture.

It will be obvious that when these operations are completed, a plurality of superimposed, uniform layers of candy will be upon the belt 23, with the candy of each layer being of a different type. The motor 26 is then started to begin movement of the belt 23. As the belt moves forward and begins to turn about the roller 22, the candies will fall from the belt 23 onto the transfer belt 3. As the candy is upon the belt 23 in uniform layers, it will fall from the belt in a uniform mixture. As the transfer belt 3 is in motion at the same time, the candy will fall evenly in a uniform mixture on the transfer belt. This latter belt will dump the mixture upon the packing belt 33. Packers will take the candy from the belt 33, fill jars or cans, and place the jars or cans on the belt 34 to be transported to other machines. Due to this arrangement, the packed jars will contain a very uniform mixture which is substantially free from broken pieces or dust.

While in the above a practical embodiment of the invention has been disclosed, it will be apparent that many changes may be made from the precise structure shown and described without departing from the scope of the invention as defined in the appended claims.

What is claimed is:

1. In a candy handling machine, a frame, an endless belt supported by the frame and having a horizontal top flight extending the length of the frame, horizontal tracks extending the length of said frame positioned above the top flight of said belt, a candy receiving hopper mounted upon and movable along said tracks, means to move said hopper to traverse said tracks, a controlled discharge for said hopper for dropping candies on the underlying belt, means carried by said hopper to level the candies dropped on said belt into uniform layers, a plurality of feeder means sequentially operable to supply separate batches of candies to said hopper intermediate the traversing movements of said hopper when said hopper is in a loading position at one end of said frame and means to cause said endless belt to move to dump candies deposited thereon by said hopper during traversing movement after the desired number of layers of candies are upon the top flight of the belt.

2. In a candy handling machine as claimed in claim 1, said hopper having a mesh bottom inclined in the direction of the end of the frame at which said hopper has its loading position, and a fan mounted at said end of said frame to direct a stream of air horizontally over the frame within the vertical span of the inclined bottom of the hopper, whereby the contents of said hopper will be subject to cooling air currents at all positions of said hopper along said frame.

3. In a candy handling machine as claimed in claim 1, said hopper having a mesh bottom and said belt being of mesh construction, and a receptacle beneath the full expanse of said belt whereby candy chips and dust may fall from said hopper and be caught in said receptacle at all positions of said hopper.

JAMES R. FLANAGAN.

References Cited in the file of this patent

UNITED STATES PATENTS

| Number | Name | Date |
|---|---|---|
| 416,950 | Ransome | Dec. 10, 1889 |
| 964,512 | Handle | July 19, 1910 |
| 1,679,717 | Greer | Aug. 7, 1928 |
| 1,778,393 | Klugh | Oct. 14, 1930 |
| 1,920,615 | Wood | Aug. 1, 1933 |
| 1,922,883 | Crago | Aug. 15, 1933 |
| 1,945,532 | Lima | Feb. 6, 1934 |
| 2,447,303 | Anderson | Aug. 17, 1948 |
| 2,504,110 | Davis | Apr. 18, 1950 |

FOREIGN PATENTS

| Number | Country | Date |
|---|---|---|
| 288,376 | Germany | Oct. 30, 1915 |